Jan. 26, 1960 C. K. GIERINGER 2,922,900

PROGRAM TIMER

Filed March 1, 1954 7 Sheets-Sheet 1

INVENTOR.
Carl K. Gieringer
BY
Wood, Herron & Evans
ATTORNEYS.

Jan. 26, 1960 C. K. GIERINGER 2,922,900

PROGRAM TIMER

Filed March 1, 1954 7 Sheets-Sheet 2

INVENTOR.
Carl K. Gieringer.
BY
Wood, Herron & Evans.
ATTORNEYS.

INVENTOR.

Carl K. Gieringer.

BY

Wood, Herron & Evans.

ATTORNEYS.

Jan. 26, 1960 C. K. GIERINGER 2,922,900

PROGRAM TIMER

Filed March 1, 1954 7 Sheets-Sheet 4

INVENTOR.

Carl K. Gieringer

BY

Wood, Herron & Evans

ATTORNEYS.

INVENTOR.
Carl K. Gieringer
BY
Wood, Herron & Evans.
ATTORNEYS.

INVENTOR.
Carl K. Gieringer
BY Wood, Herron & Evans
ATTORNEYS.

Jan. 26, 1960  C. K. GIERINGER  2,922,900

PROGRAM TIMER

Filed March 1, 1954  7 Sheets-Sheet 7

INVENTOR.
Carl K. Gieringer
BY
Wood, Herron & Evans
ATTORNEYS.

United States Patent Office 2,922,900
Patented Jan. 26, 1960

2,922,900

PROGRAM TIMER

Carl K. Gieringer, Cincinnati, Ohio, assignor to The Cincinnati Time Recorder Company, Cincinnati, Ohio, a corporation of Ohio Application March 1, 1954, Serial No. 413,163

19 Claims. (Cl. 307—141.8)

This invention relates to program timers of the type used to control automatically the completion of a power supply circuit to one or more electrical devices which are to be operated on a predetermined schedule. The present application is a continuation in part of Carl K. Gieringer application entitled "Program Timers," Serial No. 218,047, filed March 28, 1951, now abandoned.

Program timers are often used to control the ringing of bells or buzzers in schools, factories and offices, to signal lunch periods, starting and stopping times, shift changes and the like. The timer automatically closes the signal power circuit at the required times in accordance with a predetermined schedule. Once a desired signal schedule has been set up by adjusting the timer, the signals will continue to occur at their scheduled times until the schedule is altered by again adjusting the timer.

While the present invention is discussed principally in relation to its use with a signal system of this type comprising a plurality of bells or buzzers which are to be sounded according to a predetermined schedule, it will be understood that the timer may be used to govern the completion of circuits to a wide variety of electrical devices which are to be operated only at certain times, or for selected periods, or for selected purposes other than signalling.

Essentially, a program timer comprises a clock or impulse mechanism, a schedule carrier which is driven by the impulse mechanism relative to one or more switches placed in one or more signal power circuits, and a plurality of switch actuators which are secured to the schedule carrier. The impulse mechanism advances the schedule carrier at a fixed time rate ordinarily in fixed increments of distance, and is usually of such length that it will pass the switches in a given exact number of hours, normally twelve or twenty-four. Thus, any particular instant of time may be represented on the schedule carrier by that point which will be positioned adjacent the switch at the particular instant under consideration. The switch actuators, which are adapted to close or open the switches when brought into engagement with them (as required by the signal circuit), are secured to the schedule carrier at spaced intervals corresponding to the times at which the contacts are to be tripped to close the signal power circuit.

Heretofore, timers have been built embodying a long endless tape as the schedule carrier, with holes punched in the tape to function as switch actuators. This arrangement has proved less than satisfactory after prolonged usage since the tapes deteriorate, and crack and break, or the holes become enlarged causing failures in the signal system with consequent confusion to the people depending upon the signals to govern their activities. Furthermore, tapes have a tendency to stretch and may, unless positively driven, gradually slip so that even though there is on complete signal failure, an appreciable inaccuracy is introduced into the times at which the signals are sounded. Moreover, when the tapes are punched to actuate the switches, it becomes very difficult to alter a schedule once it has been set upon the tape. To cancel a given signal, it is necessary to carefully patch the tape; and to set a new one, an accurately spaced hole must be punched, both of these operations requiring special equipment and consuming a considerable amount of time.

Program systems involving time wheels or drums having actuators upon their peripheries have also been used, but these have not been generally satisfactory. If the wheel or drum is sufficiently small in diameter to be employed in a program timer of modest size, then the spacing of the actuators on the wheel periphery is too close for convenience in initially setting up of the program, and may, in fact, be too close to accommodate actuators required for signalling in successive minutes. On the other hand, if wheel diameter is increased to provide adequate actuator spacing, then the casing required for the appartus becomes excessively large and cumbrous.

The present invention is directed to a program timer including a schedule carrier comprising a pair of endless chains and switch actuators constituted by contact elements mounted upon pins carried by the chains. The chains may be of conventional design and respectively provide loops or openings which are positioned in exact transverse alignment throughout the entire path of travel of the chains in the timer. The length of each chain is such that any point on the chain will complete its travel through the timer in a given number of hours; in the machine described herein the chains travel through one complete path in exactly twelve hours, although it will be understood that this time may be any number of hours required to meet given needs. Each of the pairs of oppositely arranged loops represents a particular time corresponding to the instant that the pair of loops will pass stationary switches which are secured to the timer frame. Pins are threaded through the aligned loops and actuator elements are mounted upon the pins for movement in unison with the chains.

In the preferred arrangement, the pins upon which the actuators are mounted may be slender rods sufficiently small in diameter to pass through the chain loops and preferably headed at one end so as to be held against transverse escape, at least in one transverse direction. The actuator elements preferably are in the form of cylindrical rollers or buttons bored to enable them to be threaded telescopically onto the pins, and small set screws also may be carried by these elements to hold them in given positions. One of such elements also may be fastened to the end of each pin opposite its headed end so as to prevent transverse escape of the pins in the opposite transverse direction of the chains. It will be understood, however, that cylindrical rollers or the telescopic mounting of the rollers on the pins are not absolutely requisite, and that the actuator elements may be of other geometrical shape and may be slotted for lateral rather than telescopic pin reception.

I have found that it is also desirable, though not essential, to advance the chains at a rate of one link per minute. Thus, each pair of loops corresponds to one minute, and a signal may be set to occur at any given minute by mounting a pin through the loops of the chains corresponding to that minute, and by positioning an actuator on the pin to actuate a selected switch in the signal circuit. This arrangement enables one or more switches to be energized at a given minute or at successive minutes as desired. Of course, if a particular installation does not require signals to be given at such short intervals, the chains can be advanced at a slower rate, for example, one link every five minutes. In such a case each pair of loops still corresponds to a discrete time and by placing an actuator on a pin passing through a particular pair of loops, a signal circuit can be closed at a predetermined time.

The number of signal circuits and switches accommodated by the apparatus are dependent upon the distance which the chains are spaced apart and the relative size of the switches and actuator elements. For example, in the preferred arrangement, a series of micro-switches is placed transversely of the chains and each switch is provided with a finger depending into the path of the contact rollers. The actuators are so constructed so that only one switch finger can be depressed by each actuator. Consequently, by adjustment of a single roller transversely along the pin, a particular switch can be closed by any selected actuator. Also, by threading more than one actuator on a single pin or by using a wide actuator, a number of switches may be closed simultaneously. Each of the micro-switches is placed in a separate signal power circuit and several such circuits can thus be controlled by a single schedule carrier.

One of the principal objectives of this invention is to provide accuracy in sounding the signals precisely at the scheduled times. For this purpose, the chain is sprocket driven so that it is positively advanced a distance corresponding to one link (or the same integral number of links) for each movement of the impulse mechanism, thus eliminating any slippage between the schedule carrier and its driving mechanism. Additionally, the pin receiving loops are either formed integral with the individual links of chain or are immovably secured to them as by welding. This prevents any inaccuracy due to slippage of the loops relative to the chains similar to that occurring in the old style clip and tape arrangement. Once set, a program schedule is maintained precisely.

The sprocket drive arrangement which advances the chain also provides accuracy in maintaining the program schedule since it minimizes the effect of any stretch which might occur in the chain after periods of use. Heretofore, any stretch in the schedule carrier increased its length and this was, in some systems, directly translated into a time error in the signal system. Thus, if a friction driven tape stretched ½ an inch, every signal would be sounded later than scheduled by a time interval corresponding to ½ an inch of tape travel. Contrasted with this, any stretch in the chains comprising the schedule carrier of the present invention cannot cause a time error greater than that which can be attributed to the extremely minute increment of length of any single link or small number of links.

Another objective of this invention is to provide a program timer upon which a schedule may be set up quickly and easily or, once set up, may be altered readily. For this purpose, a minute cylinder is provided having sprockets as its ends which respectively engage the schedule carrier chains. The cylinder makes 1/60 of a revolution every minute and its surface is marked by 60 equally spaced longitudinal lines corresponding to the 60 minutes in an hour. The surface of the cylinder also carries circumferential lines aligned with the respective switches to thereby delineate circuits which are controlled by the particular actuators residing aligned therewith.

The longitudinal lines, denoting minutes, carried by the minute cylinder are so calibrated that actuators placed on pins aligned with a particular line will close the micro-switches at the minute indicated on the line. Thus an actuator covering a line numbered 15 will close a switch at 15 minutes after the hour. To indicate the particular hour at which a switch will be operated, a pilot clock is provided which is driven in synchronism with the minute cylinder.

It will be appreciated that if the cylinder engaging the schedule carrier chains is driven in a manner different from that just described; so that, for example it rotates one-twelfth of a revolution every five minutes, then the cylinder is provided with twelve longitudinal lines, instead of sixty. Each of the twelve lines designates a particular time, the times varying by five minute intervals. Thus the longitudinal lines on such a cylinder are marked 0, 5, 10 . . . etc. The actuators are placed on pins passing through loops aligned with the longitudinal line corresponding to the desired signal time, in the same manner as before.

In a program timer, the mechanism elements which are requisite inherently present a complex view, especially to the unskilled adjuster. One of the features of the present invention resides in a construction which conceals and and protects the major portion of the operating mechanism but which presents the carrier chains in conveniently accessible positions so that actuators readily may be positioned to cause switch actuation at desired times. Specifically, in the present construction, the time dials and associated chains protrude through a panel behind which the other operating mechanism is housed. The panel provides a rest surface against which the operator may support his hands while inserting pins and attaching actuators in establishing a given schedule. Any desired portions of the chain schedule carriers and corresponding time indications become accessible and visible by manually advancing the schedule carriers. The arrangement enables a compact yet easily adjusted structure to be provided.

In order to set a signal upon the recorder, the clock and minute cylinder are rotated manually until the clock hands register a time shortly before the signal time. This will cause the longitudinal line corresponding to the signal time to appear on that portion of the cylinder projecting through the front panel directly before the operator. A pin may then be inserted through the loops on each of the chains which are adjacent to the longitudinal line marked with the proper minute number, and the contact actuators corresponding to the number of circuits to be energized may be threaded upon or attached to the pin. The actuators may then be adjusted longitudinally until they are aligned with the bands or peripheral lines corresponding to the circuits to be energized. Each of the desired signals may be set in this manner until the entire signal schedule is placed upon the timer.

It will be seen from the preceding description that the apparatus of the invention minimizes the chance of error in initial schedule set-up, even when the timer is adjusted by the most inexperienced operator, since, when properly positioned, each actuator will reside in readily visible alignment with the selected time line and the circumferential line or band corresponding to the particular circuit to be energized. Furthermore, the minute cylinder may be rotated to check at a glance whether or not a particular signal is set to occur at the proper time and on the proper circuit. Another feature of this arrangement is realized when a schedule is to be altered, since any number of actuators can be removed or added without disturbing those which are not to be changed.

A further object of this invention is to provide a simple means by which the scheduled signals may be silenced during any desired period such as twelve or twenty-four hours without disturbing the actuators or chains. In a school, for instance, it may be desirable to ring class bells and so forth during the daytime and yet be undesirable to ring them at night or over the weekend. In a preferred embodiment, a set of calendar switches is provided to selectively silence a circuit during any desired period. Each calendar switch is inserted into a signal system in series with the minute switches operated by the actuators carried by the schedule chains. If a calendar switch is closed, the minute switch will control the signal circuit. However, if the calendar switch is open, the circuit cannot be completed and the schedule set on the schedule carrier chains will be of no effect. The calendar switches therefore condition the minute switches to close the power circuits.

To control the actuation of the calendar switches, a calendar cylinder is provided. This preferably is advanced by the impulse mechanism in unison with the minute cylinder but at a different rate, for example, 1/14 of a revolution every twelve hours. A dial of substantial diameter is secured to each of the cylinder ends; and these dials are each provided with fourteen equally spaced pin receiving openings. The openings on the dials are aligned so that fourteen pins may be carried by the dials. Actuators are disposed on pins longitudinally of the cylinder and correspond to the fourteen different twelve hour periods of the week.

The calendar switches are arranged in a line longitudinally of the cylinder and each switch is provided with a finger projecting into the path of the respective actuators so that each switch may be closed during any twelve hour period by engagement with an actuator. The calendar cylinder is calibrated by a series of longitudinal lines delineating strips which conveniently designate daytime and nighttime twelve hour periods controlled by the actuators on the pins. As on the minute cylinder, the contact rollers are positioned peripherally for selection of the time at which the switch will be actuated, and longitudinally for selection of the various switch controlled circuits.

In a modification in the program timer, selective silencing of any program circuit is obtained for a predetermined period by means of a lug carrying calendar wheel. In this modification, calendar switches are eliminated and the minute switches are mechanically conditioned for operation during a given twelve or twenty-four hour period, or are rendered inoperative during a given period. More specifically, in the modification the minute switches are pivotally mounted adjacent to the schedule carrier and the switch fingers are disposed for engagement with contact actuators as explained above. However due to the pivotal mounting of the switches, a contact actuator engaging a switch finger normally pivots the switch without closing the switch contacts.

A calendar wheel is mounted above a minute switch and is advanced by an impulse mechanism so that it makes a complete revolution in a predetermined period, preferably a week. The calendar wheel is rotated 1/7 of a revolution every twenty-four hours if signals are to be selectively silenced during twenty-four hour periods, and is rotated 1/14 of a revolution every twelve hours if signals are to be silenced every twelve hour period. The periphery of the calendar wheel is provided with means such as narrow radial slots for receiving lugs at a plurality of spaced stations equal in number to the movements made by the calender wheel in completing one revolution. Each lug receiving station thus corresponds to one discrete period. When a lug carried by a station is disposed adjacent to one of the switches, it abuts the switch and locks it against pivotal movement so that any actuator coming into engagement with the switch finger closes the switch contacts. Thus, lugs can be placed at the stations corresponding to periods during which signals are desired, and can be removed from the stations corresponding to periods when no signals are desired, and thereby provide for selective silencing of the signals without interfering with the schedule carrier.

A still further object of this invention is to provide an adjustable duration contact for selectively controlling the length of time each signal will be sounded. The duration contact is inserted in series with the minute switch and calendar switch in each of the signal power circuits.

These and other objects and advantages of my invention will be apparent from a further consideration of the following detailed description of the drawings in which a typical embodiment of the invention is disclosed. In the drawings.

Figure 1:
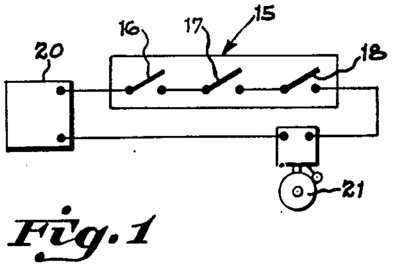
Figure 1 is a schematic diagram of one of the signal circuits controlled by the timer.
Figure 2:
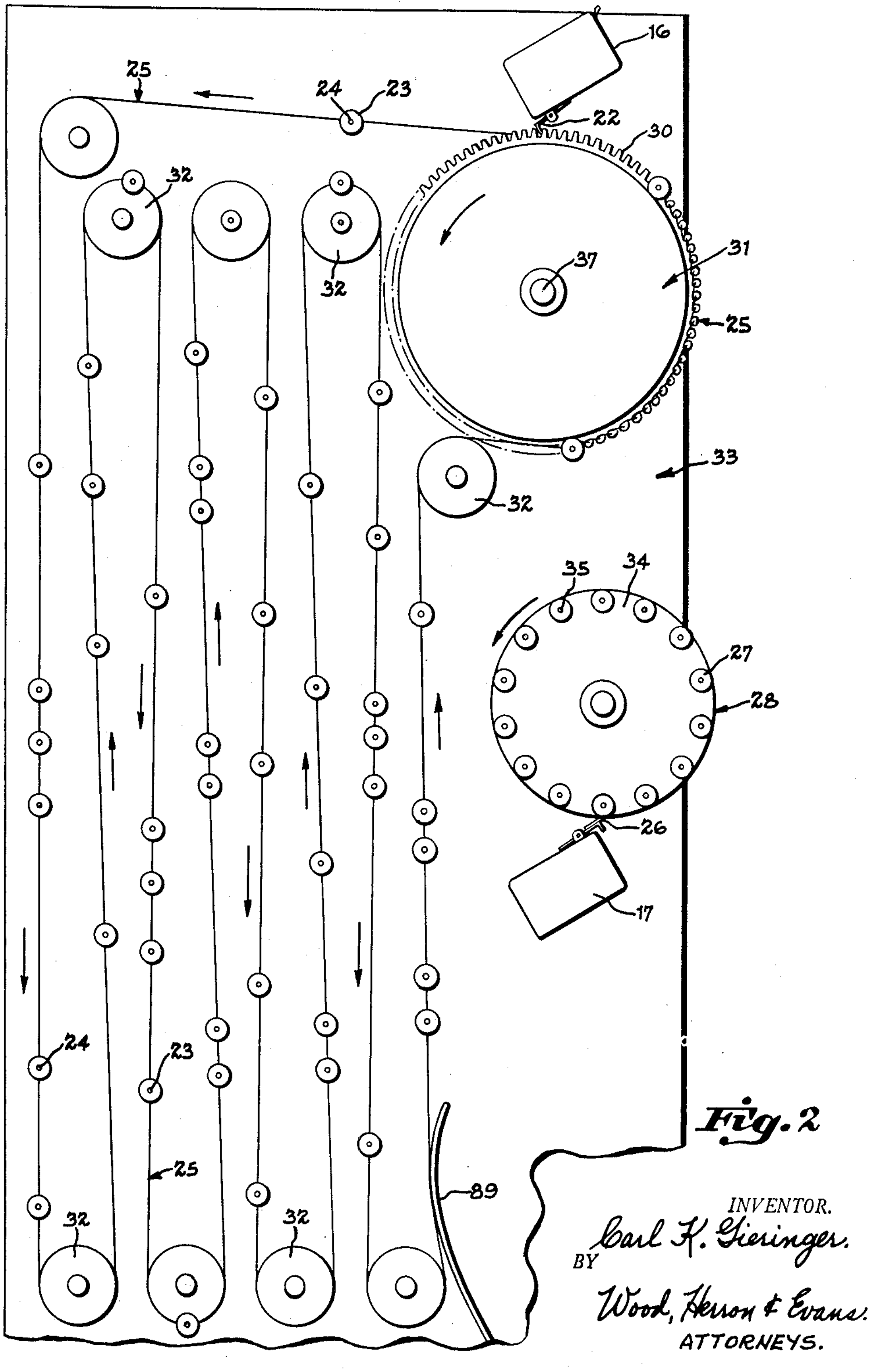
Figure 2 is a diagrammatic side view of the program timer.

As shown diagrammatically in Figures 1 and 2, a preferred form of the program timer 15 includes three switches 16, 17 and 18 which are placed in series in a supply circuit from power source 20 to a bell 21. Minute switch 16 may be a snap action micro-type switch having a finger 22 depending into the path of one of the actuators 23 which are secured to the pins 24 carried by schedule chains 25. Calendar switch 17 is a snap action micro-switch similar to the minute switch 16. It has a finger 26 which is operated by one of the actuators 27 associated with the calendar cylinder 28. Switch 18 is a duration contact best shown in Figure 5 and is used to selectively control the period during which the signals are sounded.

The program timer, as shown diagrammatically in Figure 2, comprises generally a pair of continuous chains 25 which move past the minute switches 16. The chains 25 are driven by sprockets 30 secured to the ends of the minute cylinder 31 and are festooned over a plurality of idler pinions 32 disposed within the timer casing 33. The length of each chain is such that any particular point on it moves completely through the timer and hence past minute switch 16 exactly every twelve hours. Pins 24 are sustained by each of the chains 25, and each pin carries one or more actuators 23 which, in turn, are adapted to engage the fingers 22 which depend from the minute switches 16 into their paths. The pins are spaced along the chains at points corresponding to the times at which the signals are to be sounded, hence, the pins by their positions determine the times at which the actuators that they carry will engage the minute switches.

A second rotating cylinder 28 has a calendar dial 34 secured to each of its ends. The calendar dials 34 carry pins 35 having actuators 27 threaded thereon and adapted respectively to engage the fingers 26 of the calendar switches 17. The calendar cylinder rotates 1/14 of a revolution every twelve hours, and each pin which it carries controls one twelve hour period during the week, as will be explained later.

Figure 3:
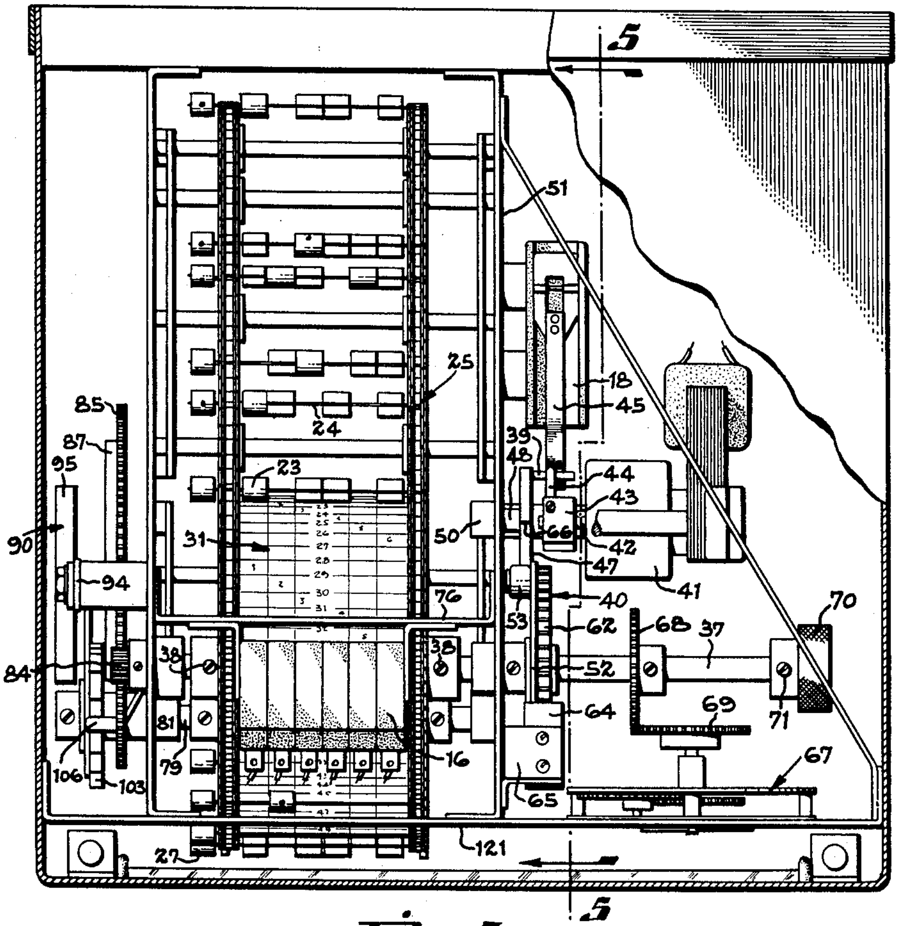
Figure 3 is a top elevational view of the timer with the cover partially broken away.
Figure 12:
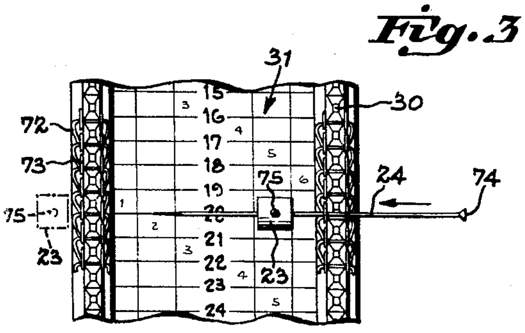
Figure 12 is an enlarged front elevational view of the minute cylinder, pin and roller contacts showing details of assembly.
Figure 13:
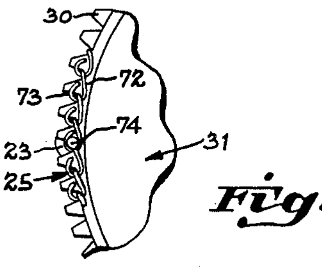
Figure 13 is a fragmentary side view of the chain and a pinion.
Figures 4, 6, 7:
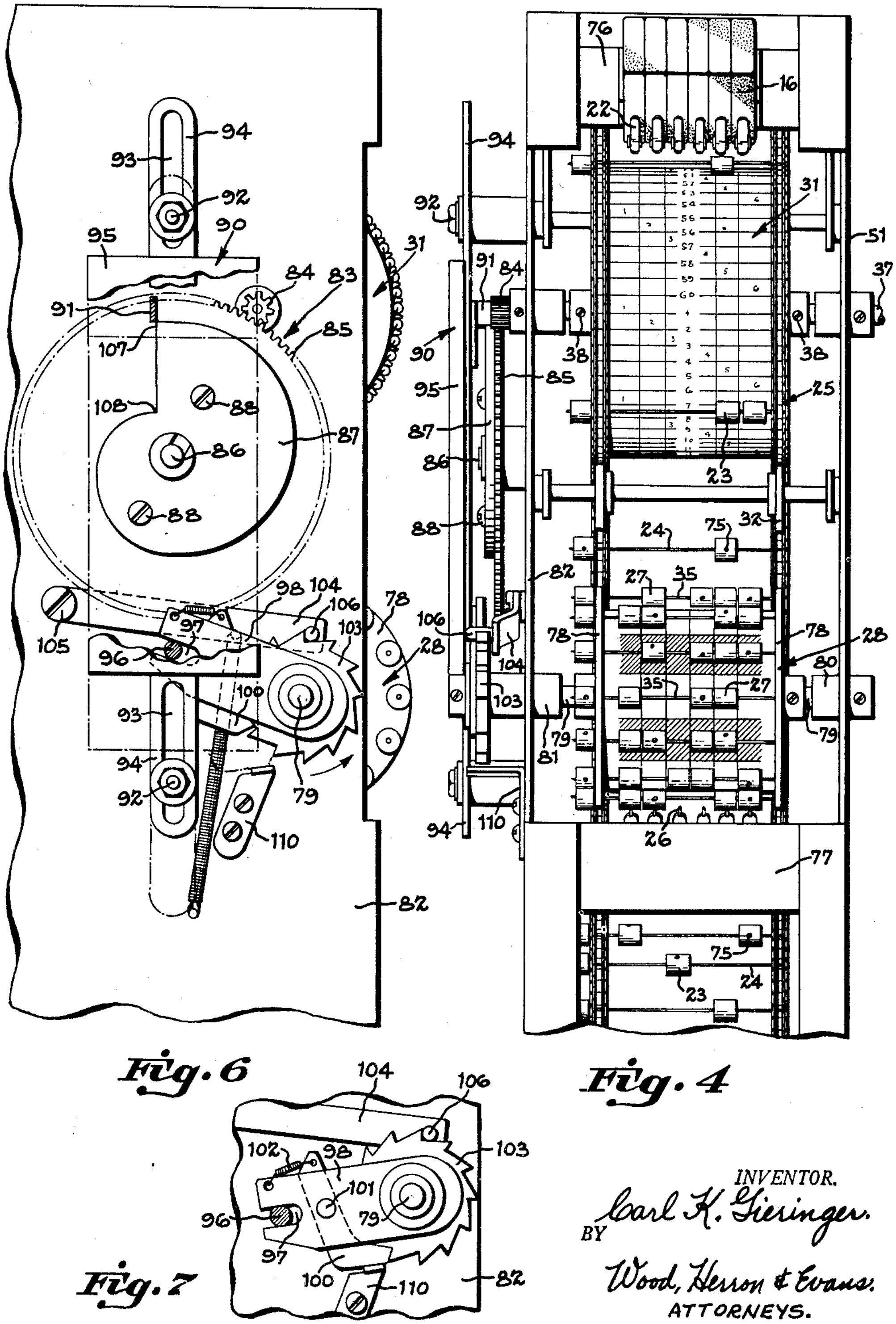
Figure 4 is a partial front elevational view of the timer with the cover and front panel removed.
Figure 6 is a partial right-hand side view showing the calendar dial driving mechanism about to advance the calendar dial.
Figure 7 is an enlarged view of the ratchet and pawl of the calendar rotating mechanism shown in Figure 6.
Figure 5:
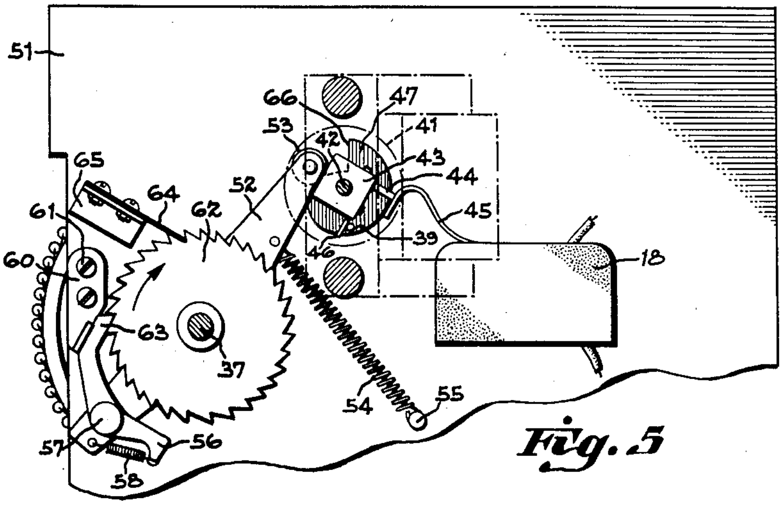
Figure 5 is a partial cross sectional view taken along lines 5—5 of Figure 3 showing the impulse drive mechanism for the minute wheel and chain.

In the preferred embodiment, as shown in Figures 3, 4 and 5, the minute cylinder 31 and sprockets 30 are secured to drive shaft 37 by means of set screws 38. The drive shaft is connected to an impulse mechanism shown generally at 40 which advances the minute wheel 1/60 of a revolution every minute. While the driving mechanism shown in the preferred embodiment is of the impulse type, it is contemplated that a continuous drive mechanism moving the chains at a constant rate may also be used in a timer embodying the novel features of this invention. Also, the program timer may be used in conjunction with a master clock, in which case, a solenoid drive may be used.

The impulse mechanism shown comprises a small synchronous motor 41 which turns shaft 42 at the constant rate of one revolution per minute. Shaft 42 carries block 43 which has two pins secured thereto. Pin 44 is adapted to engage arm 45 of duration contact 18 and is adjustably mounted in an aperture in the block so that the amount the pin extends beyond the block may be adjusted to vary the signal duration period. Pin 46 functions as the driving means for cam 47 through engagement with pin 39 extending axially of the cam. Cam 47 is mounted upon a pin 48 which rotates in bearing 50 secured to frame member 51, and an arm 52, pivotally mounted on drive shaft 37, is provided with follower 53 which rides on the surface of cam 47. The arm 52 is urged against the cam surface by spring 54 which is anchored to pin 55 secured to frame member 51. The lower end of arm 52 carries a pivoted rocker arm 56 which rotates about pin 57 and is urged clockwise by spring 58. Movement of the rocker arm 56 is constrained however by engagement of the arm with a stop 60 secured to frame member 51 by means of bolt 61. A ratchet wheel 62 is secured to driving shaft 37, and a spring stop 64, which is carried by bracket 65 engages the ratchet wheel teeth to prevent any retrograde movement of shaft 37 when arm 56 is disengaged from the ratchet wheel 62.

As shaft 42 rotates at a constant speed, arm 52 is rotated counter-clockwise and rocker arm 56 is simultaneously forced in a counter-clockwise movement away from engagement with stop 60. Tooth 63 on the end of rocker arm 56 slides over one tooth of the ratchet wheel 62. As the arm 52 moves clockwise as follower 53 encounters the sharp face 66 of cam 47, tooth 63 of rocker arm 56 forces the ratchet wheel 62 and shaft 37 to rotate clockwise until the rocker arm 56 engages stop 60. Thus, the ratchet wheel 62 is turned step by step, and it imparts a similar movement to shaft 37 and minute cylinder 31.

A pilot clock 67 is driven in synchronism with the minute cylinder through gear 68 mounted on shaft 37, which meshes with gear 69 on the clock mechanism. Clock movement 67, shaft 37 and minute cylinder 31 may be turned manually by means of a knob 70 secured to the end of shaft 37 as by set screw 71.

In the preferred embodiment, the sprockets 30 secured to shaft 37 are each provided with sixty teeth so that the chain 25 is advanced one link per minute. The chains are preferably of the so-called "ladder" type and each link of chain 72 is provided with or presents a loop 73 adapted to receive a pin 24 with which actuator elements may be associated. Pins 24 are threaded through the oppositely disposed loops of each chain and are held in place by the engagement of pin head 74 with the loop of one chain and by engagement of an actuator element 23 or similar device secured to the pin by set screw 75 against the opposite loop of the other chain. One or more actuators 23 are secured to each pin 24 intermediate the chains 25 by means of set screws 75. Leaf springs 39 bear against the chains 25 to maintain the proper chain tension.

The minute signal switches are so positioned upon the frame member 76 that their fingers 22 depend into the paths of the respective actuator elements 23. Each switch is adapted to carry a relatively high current and is in direct circuit connection with a separate signal circuit; thus, the program timer shown may control six signal circuits. Obviously, a larger or smaller number of switches may be provided, and a larger or smaller number of circuits controlled. Each actuator operates only one finger when it is properly positioned so that by adjusting these elements over the pins 24, any particular switch which is operated can be selected at will.

The calendar switches 17 are secured to frame member 77 so that their operating fingers 26 project into the paths of actuators 27 associated with calendar cylinder 28. Each of the calendar switches 17 is placed in circuit control (e.g. series ) connection with a minute switch 16 in an individual signal power circuit. The actuators 27 are threaded on pins 35 which pass through oppositely arranged openings in calendar dials 78. As previously noted, fourteen equally spaced pins may be carried by the calendar dial, to represent the different twelve hour periods of the week. Hence, the signals set on any circuit by the actuator carried by the schedule chains may be silenced by removing a corresponding actuator from the calendar dial.

Calendar dials 78 and calendar cylinder 28 are mounted upon shaft 79 which rotates in bushings 80 and 81 secured to frame members 51 and 82 respectively. The calendar dials and calendar cylinder are rotated 1/14 of a revolution every twelve hours by the calendar drive 83 best shown in Figure 6. The calendar drive includes a pinion 84 secured to main drive shaft 37. Pinion 84 meshes with large gear 85 which rotates about shaft 86 and carries cam 87 which is fastened to gear 85 as by bolts 88.

Slider 90 having finger 91 which rides on cam 87 moves reciprocally vertically and is guided by bolts 92 riding in slots 93 provided in slider extensions 94. Slider 90 also carries weight 95 which urges the slider downwardly.

Slider 90 is provided with pin 96 which rides in slot 97 provided in arm 98 adapted to rotate about shaft 79. This arm carries a rocker arm 100 which is pivotally secured to arm 98 by pin 101 and which is urged in a counter-clockwise direction by spring 102. The rocker engages the teeth of ratchet wheel 103 which is secured to shaft 79. Lever arm 104, which is pivoted to frame member 82 at 105, carries stop 106 which prevents retrograde movement of ratchet 103.

The cam 87 rotates in a clockwise direction and as it does so, slider 90 is raised by the engagement of finger 91 with the cam surface. Pin 96 secured to slide 90 simultaneously rotates arm 98 in a clockwise direction about shaft 79, releasing the tension on spring 102 and allowing rocker 100 to slip over one tooth of ratchet wheel 103. When the slide 90 drops from the high point 107 of the cam to the low point 108, arm 98 is rotated in counter-clockwise direction forcing rocker 100 to rotate the ratchet wheel 103 in clockwise direction until a rocker is restrained by stop 110 secured to frame member 82. The ratchet wheel 103 causes shaft 79 to rotate and with it calendar cylinder 28 and calendar dial 78.

The manner in which the signal schedule is set up on the timer can best be seen in Figures 10 to 14. A plurality of circumferential lines 111 divide the cylinder into a series of bands 112 corresponding to the switch (and signal circuit) which will be closed by the actuator aligned with the band. Longitudinal lines 113 are equally spaced about the periphery of the cylinder to indicate the sixty minutes of an hour.

Figure 8:
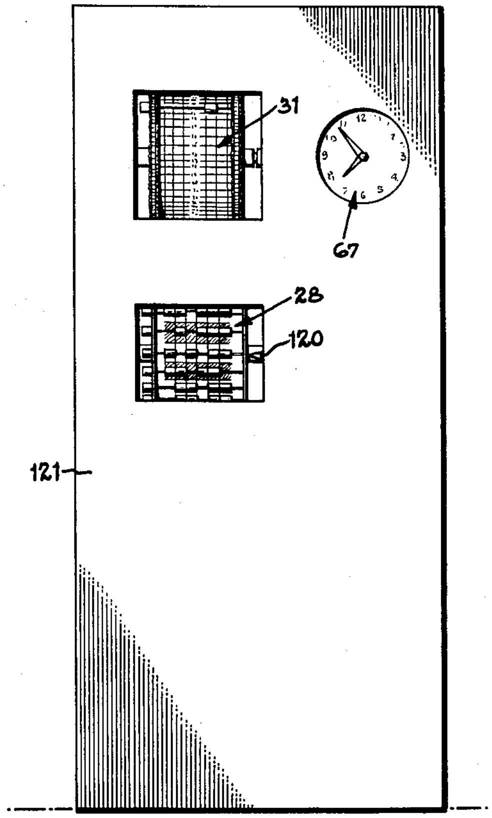
Figure 8 is a front elevational view of a program timer with the cover removed.
Figure 9:
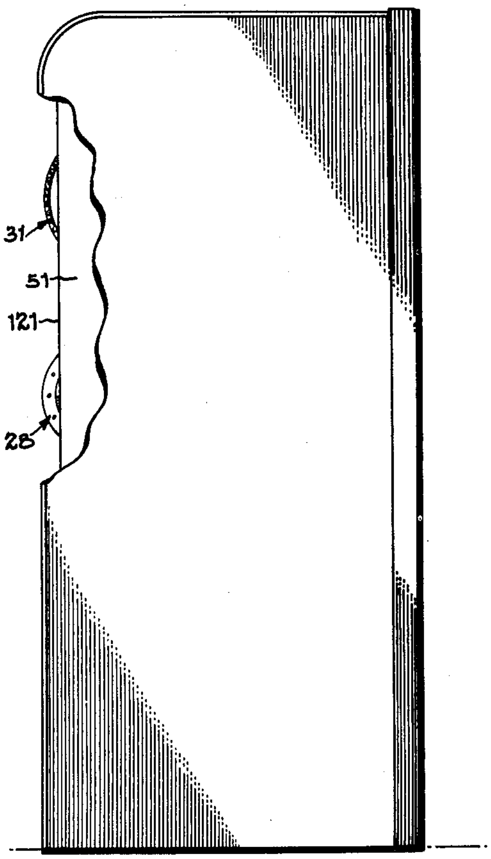
Figure 9 is a side elevational view of the timer with the cover partially broken away to show the arrangement of the minute cylinder, calender dial and front panel.
Figure 14:
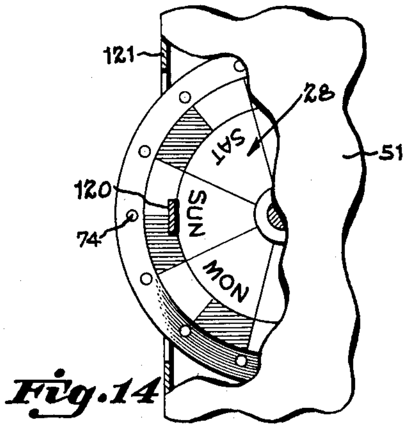
Figure 14 is a partial side elevational view of the calendar dial.
Figure 10:
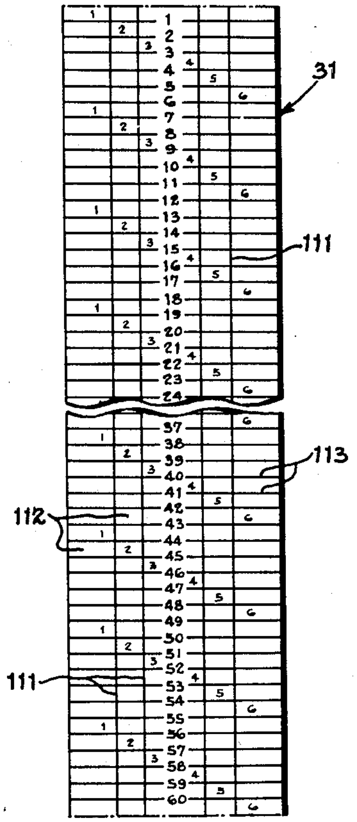
Figure 10 is a partial developed view of the minute cylinder.
Figure 11:
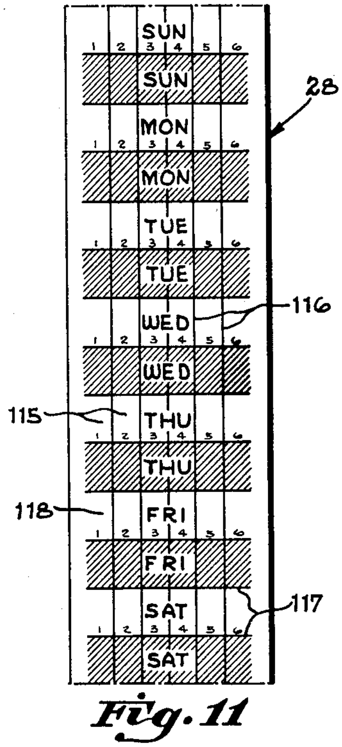
Figure 11 is a developed view of the calendar cylinder.

Figure 11 is a view similar to Figure 10 showing a development of the calendar cylinder. This cylinder is also divided into a number of marked circuit bands 115 by circumferential lines 116. The circuit bands are numbered to show the circuits which are controlled by actuators aligned with that band. A series of longitudinal lines 117 divides the cylinder into fourteen strips 118, each strip corresponding to a twelve hour period of the week. Thus, for example, the clear "Sunday" strip may represent the period from six a.m. until six p.m. Sunday and the cross hatched Sunday strip may correspond to the period from Sunday six p.m. until six a.m. Monday. Calendar dials 28 as shown in Figure 14 are also calibrated in twelve hour periods and a pointer 120 secured to front panel indicates which of the calendar dial settings is presently in operative association with the calendar switches. It is to be noted that the minute and calendar cylinders are mounted adjacent to the front of the timer with peripheral portions protruding outwardly through openings in front panel 121. This provides easy access to the chains for schedule set up, yet precludes an unskilled person making an adjustment from gaining access to other parts of the apparatus.

To illustrate the operation of the program timer, suppose that it is desired to ring the bells on signal circuits 1 and 3 Monday through Friday at 4:20 p.m. and Saturday at 4:20 a.m. First, the pilot clock 67 and minute cylinder 31 are turned by means of knob 70 until the pilot clock 67 reads a few minutes (approximately fifteen in the embodiment shown) before the desired time. This will cause the minute cylinder to rotate until the twenty minute line is disposed on that part of the cylinder projecting outwardly through the opening in front panel 121. A pin 24 is then inserted through the loop 73 in one chain and two actuator elements are threaded over the pin. The pin is then passed through the opposite loop in the second chain and is secured in place by a third element 23 which is fastened down by set screw 75. Next, the actuators 23 are adjusted transversely of the pin until they are brought into alignment with circuit bands marked 1 and 3 where they are secured in place by set screws 75. This completes the setting up of the minute schedule.

The calendar schedule is set by manually rotating the calendar cylinder until the Monday p.m. strip projects outwardly through the opening in front panel 121. Then, a pin is passed through the opening in one calendar dial and two actuators are threaded on this pin. Pin 35 is then secured in place and actuators 27 are adjusted longitudinally, just as was done with the minute cylinder. This process is repeated for each of the strips corresponding to Tuesday, Wednesday, Thursday, and Friday p.m. and Saturday a.m. Finally, the calendar dial is rotated until the marking on the calendar dial corresponding to the time at which the schedule is being set is aligned with pointer 120.

The timer may then be energized and synchronous motor 41 will advance ratchet wheel 62 step by step which ratchet wheel in turn imparts a similar movement to the minute cylinder 31 and sprocket 30. The schedule carrier chains 25 are advanced one link per minute and at 4:20 actuator 23 will be brought into engagement and will depress fingers 22 of minute switches 16 associated with circuits 1 and 3. If the twelve hour period then prevailing is such that calendar switches 17 associated with circuits 1 and 3 are also depressed by engagement with contact actuators 27 carried by the calendar dials, signal circuits 1 and 3 will be closed for the length of time that duration contact 18 is closed. Duration contact 18 is closed for a short period during each minute of time, the length of time being determined by the interval during which pin 44 is in engagement with bent finger 45 of the duration contact. This interval may be varied by adjusting the length of pin 44 which projects beyond the block 43.

Figure 15:
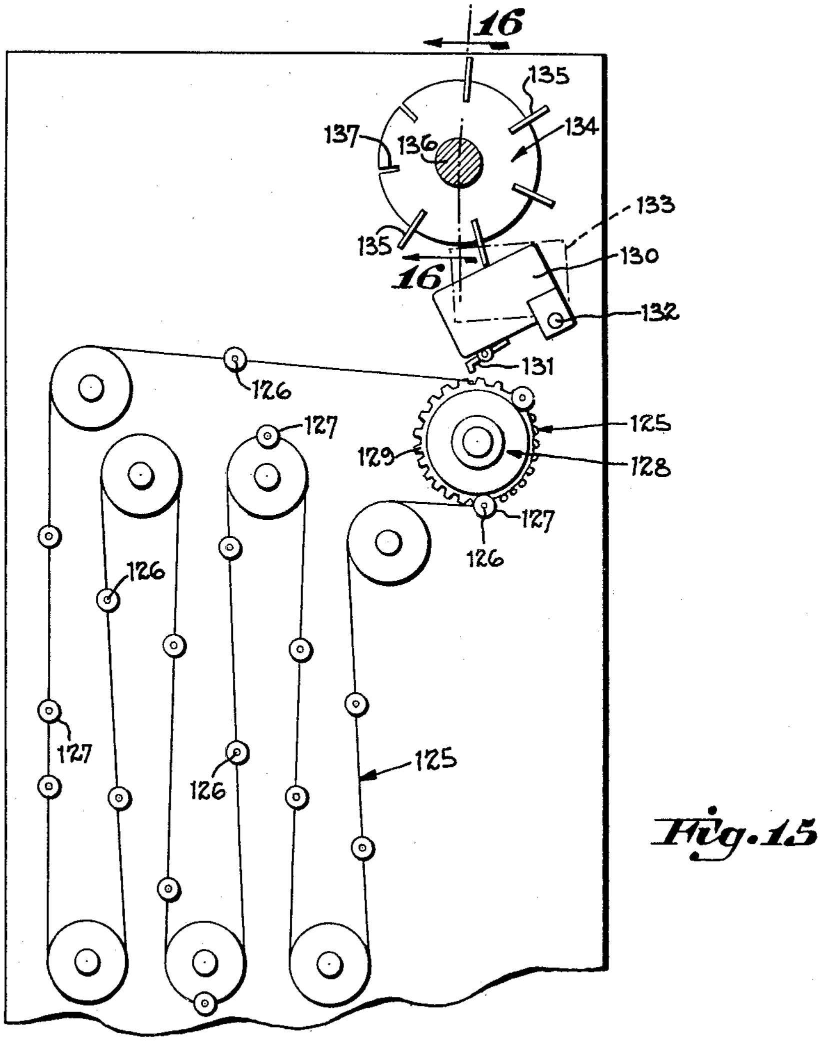
Figure 15 is a partial diagrammatic side view of a modified program timer embodying a lug carrying calendar wheel.
Figure 16:
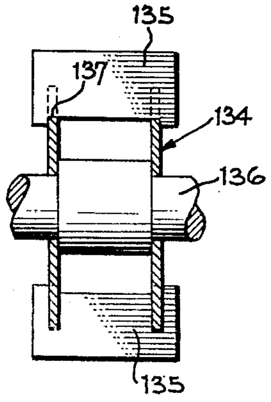
Figure 16 is an enlarged cross sectional view of a calendar wheel and lug taken along line 16—16 of Figure 15.

A modified embodiment of a program timer embodying a lug carrying calendar wheel instead of calendar switches for selectively silencing signals is illustrated in Figures 15 and 16. The program timer shown in Figure 15 comprises a pair of schedule carrying chains 125, which are preferably of the so-called "ladder" type, including a plurality of small interconnected links, each link presenting a pin receiving loop. The respective loops of the two chains are maintained in transverse alignment during the passage of the chains through the timer, so that the loops are adapted to carry a plurality of pins 126 for supporting contact actuators 127. The construction of these latter elements is described in detail in conjunction with the disclosure of the preferred embodiment.

The program timer also includes an impulse mechanism which is not shown but may be of any suitable type for rotating a schedule cylinder 128 at a fixed time rate. As shown, schedule cylinder includes two sprockets 129, each of which is provided with 24 teeth. The sprockets are driven in unison at a fixed rate preferably $\frac{1}{24}$ of a revolution every 5 minutes, so that the sprocket completes a revolution every two hours and is effective to advance the chains one link every 5 minutes. Consequently, each link of chain corresponds to a discrete 5 minute interval within the 24 hours or other period represented by the length of chain. In this embodiment the chain preferably is of such length that any link completes its travel through the timer in exactly 24 hours. If desired, however, the chain could be of a shorter length so that its travel would be completed in 12 hours, or some other period.

One or more schedule switches 130 are mounted above schedule cylinder 128, each switch being provided with a finger 131 depending into the path of travel of actuators 127 carried by the chains. If a plurality of switches is provided, the switches are spaced transversely of the path of chain movement as in the preferred embodiment. As shown, each switch 130 is preferably a micro-switch which is pivotally supported from pin 132 at its end remote from finger 131. The relative weight of the switch and resiliency of the spring associated with finger 131 are such that an actuator is normally effective to pivot the switch about pin 132 into a position indicated by dot-dash lines 133, without closing the switch contacts.

A calendar wheel 134 is rotatably mounted above each schedule switch and is driven by an impulse mechanism so that it makes $\frac{1}{7}$ of a revolution every 24 hours. The calendar wheel is provided with means for locating switch hold down elements such as lugs 135 at seven stations equi-spaced about its periphery. In one suitable arrangement shown in Figure 16, the calendar wheel comprises two spaced discs mounted on shaft 136, each disc being provided with seven narrow radial slots 137. The slots are adapted to frictionally hold lugs 135 inserted therein. Calendar wheel 134 is spaced from switch 130 so that the switch can normally pivot to a position permitting actuators 127 to pass beneath finger 131 without tripping the switch. However, when a lug is inserted into one of the slots 137 and is rotated by the calendar wheel into a position closely adjacent the top of switch 130, it restrains the movement of the switch away from the schedule carrier so that actuator 127 is effective to shift finger 131 and close the switch contacts.

It can be seen that each lug carrying station is brought into registry with the top of the switch for one 24 hour period out of every seven. During a period when a lug is in registry with the switch the actuators carried by the chains will cause the switch to close in accordance with a predetermined schedule to complete the program circuit. However, when an empty station is disposed opposite the switch, the actuators will not be effective to close the switch contacts and the schedule signal set up on the chain is silenced for a 24 hour period. Obviously, if it is desirable to selectively silence the program signals during shorter periods, such as 12 hour intervals, more lug carrying stations are provided on the calendar wheel and it is advanced at a correspondingly higher frequency.

It is apparent that once a contact actuator carried by the chains engages the finger of a schedule switch, which is held down by a lug, the switch will be closed for a five minute period. However, if the program circuit including that particular schedule switch is used to sound a buzzer or the like, the signal preferably should last for only a few seconds. Thus, it is desirable to connect a duration switch, such as the one described in the preferred embodiment, in series connection with the schedule switch. Also, in the embodiment shown in Figure 16, signals cannot be sounded at less than five minute intervals. However, if more frequent signals are desired, a fine setting switch cooperating with a fine setting wheel of the type described in conjunction with the modification shown in Figure 17, may also be connected in series with the schedule switch.

Figure 17:
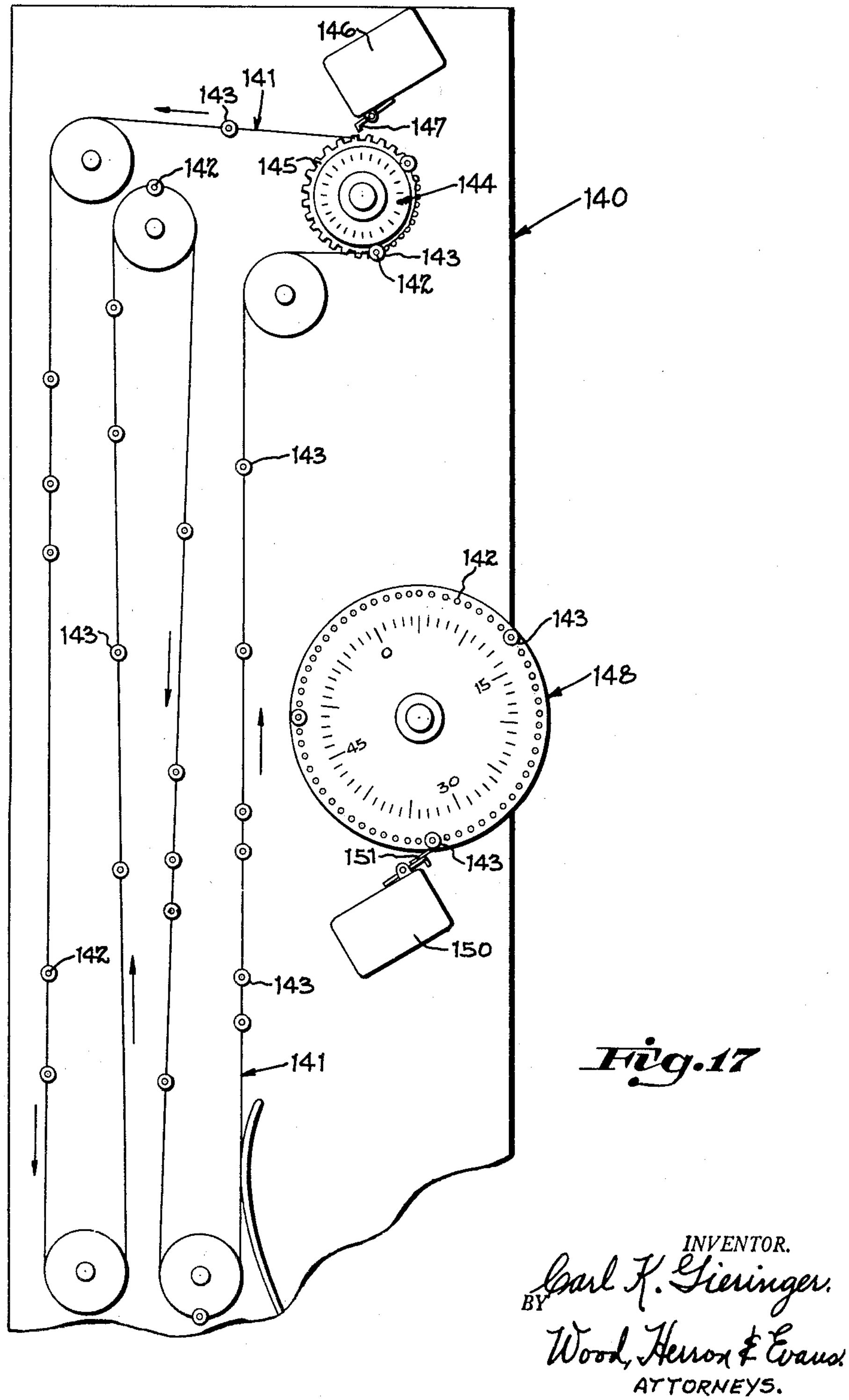
Figure 17 is a diagrammatic side view of a second modification of the program timer.

The schedule is set up on the chains in the present modification in substantially the same manner it is set up on the program timer of the preferred embodiment. That is, suitable time denoting indicia are provided adjacent to the periphery of sprockets 129 of the schedule cylinder 128. The indicia may be in the form of a drum as in the preferred embodiment, or may be in the form of radial sprocket markings, as shown in Figure 17. In either case, a pin is inserted through loops in the schedule chains aligned with the marking denoting the desired signal time in minutes. The schedule chain is positioned so that the signal is sounded at the right hour, by reference to a pilot clock (not shown) in substantially the same manner as in the preferred embodiment.

A second modification of the program timer is disclosed in Figure 17. As shown in this figure, program timer 140 comprises a schedule carrier 141, including two spaced parallel chains having a plurality of laterally aligned links. The chains carry a plurality of pins 142 upon which are mounted actuators 143. The chains, pins and actuators are preferably constructed in the same manner as those employed in the preferred embodiment. In the modification shown, the chains advance completely through the timer in exactly twenty-four hours. However, a shorter length of chain is used than that employed in the preferred embodiment so that a substantially more compact unit is obtained.

The chains are driven by a schedule wheel 144 including two sprockets 145, each of which contains twenty-four teeth. The sprocket is rotated by a suitable impulse mechanism $\frac{1}{24}$ of a revolution every 5 minutes thereby advancing the chains one link every fifth minute. Each link of chain thus corresponds to a discrete 5 minute period during the day.

One or more schedule switches 146 are disposed adjacent to wheel 144, each switch being provided with a finger 147 disposed in the path of travel of actuators 143 carried by the chains. If more than one switch is provided they are spaced transversely of the path of chain movement as explained above. In addition to the switches disposed between the chains, a switch may be disposed outside of one of the chains with its finger disposed for engagement with an actuator placed on the end of the pin. Such an actuator thus provides a double function in that it supports the pin against lateral displacement and also trips a switch finger. It will be apparent that a contact actuator once brought into engagement with the switch finger will displace that finger for a 5 minute period.

In order to provide a means for readily setting up a program on the schedule chains, suitable time denoting indicia is provided on schedule wheel 144. This indicia can be in the form of the markings employed in the minute wheel of the preferred embodiment or alternatively can be in the form of identified lines printed on one of the sprockets. As shown, one of the sprockets 145 is marked with a plurality of radial lines corresponding to 5 minute intervals. Each marking denotes the first minute in which an actuator carried on a pin passing through loops aligned with the marking will be brought into engagement with finger 147 of switch 146. The hour at which the actuator will engage the switch is determined by reference to a pilot clock (not shown) in generally the same manner as in the preferred embodiment.

A fine setting wheel 148 is provided so that a program circuit can be closed during any particular minute within the 5 minute interval. As shown, this wheel comprises two spaced discs, each disc having sixty pin receiving apertures disposed adjacent to its periphery. The apertures in opposite discs are aligned so that a pin carrying one or more contact actuators may be inserted between them. The fine setting wheel is driven by an impulse mechanism so that it makes one complete revolution every hour, the wheel being advanced $\frac{1}{60}$ of a revolution every minute. One or more fine setting switches 150 are mounted adpacent to wheel 148. Each switch includes a finger 151 depending into the path of actuators carried by the wheel. Switch 150 is placed in electrical series connection with switch 146 so that a program circuit cannot be completed until both switches are closed.

Thus in this embodiment, the contact actuators carried on the schedule carrier, function to condition a program circuit for completion during selected 5 minute intervals; and the circuit is closed at a particular minute within the interval by means of the cooperation of actuators carried by fine setting wheel 148 and switch 150. The duration of the signal can be controlled by means of a duration switch inserted in series with switches 146 and 150, as explained in connection with description of the embodiment.

A program timer of this modified type presents many of the advantages of the preferred form of program timer, including high accuracy in closing the program circuits at precisely the scheduled times, ease of setting up a program and the like. In addition, since each link on the schedule chains corresponds to a 5 minute interval, instead of a one minute interval, the chains are substantially shortened and the program timer is very compact. This compactness renders it particularly adaptable for incorporation into the time recorders of the type in which a card is imprinted by a workman to denote the time of his arrival and departure from work.

When a program timer of the type shown in Figure 17 is built into a time recorder, the same impulse mechanism used for positioning the printing wheels of the recorder also functions to advance the schedule carrier. One program circuit of the carrier is used to actuate a positioning mechanism for the card receiving tray to shift the tray and the location of imprints made upon time cards in accordance with a predetermined schedule. If desired, a second program circuit can be used to actuate a color printing mechanism so that the cards are imprinted with one of two or more colors in accordance with a desired time schedule. Another program circuit of the timer can be used in the usual manner to sound buzzers for signalling lunch periods and the like.

From the foregoing discussion the general principles of my invention, and the disclosure of several embodiments, those skilled in the art will readily comprehend the various other modifications to which my invention is susceptible.

Having described my invention, I claim:

1. A program timer comprising a pair of chains, means for advancing said chains in unison at a fixed time rate so that said chains complete a course of travel through said timer in exactly twelve hours, said chains embodying an endless succession of loops which are respectively aligned in pairs, each pairs of opposite loops so formed corresponding to a discrete time in the twelve hour period differing from the times associated with the other pairs of loops, a pin engaging one pair of loops, a contact roller carried by said pin, a switch having a finger projecting into the path of said contact roller, means for indicating the time corresponding to any pair of said loops, said means including a pair of sprockets engaging said chains, a minute cylinder disposed intermediate the sprockets and turned in synchronism therewith, said minute cylinder having a plurality of longitudinal lines calibrated in minutes, each of said lines being aligned with one pair of loops whereby the time corresponding to said loops may be determined from the indica on the longitudinal line in alignment with said loop.

2. A program timer comprising a pair of chains, means for advancing said chains at a fixed time rate so that said chains complete a course of travel through said timer in an exact number of hours, each of said chains presenting a plurality of loops, the loops of one of said chains being positioned in exact transverse alignment with the loops of the other of said chains, each pair of loops so formed corresponding to a discrete time differing from the times associated with the other pairs of loops, a pin engaging said loops and being carried thereby in unison with the chains, a contact roller carried by said pin, a switch having a finger projecting into the path of said contact roller, means for indicating the minute corresponding to any pair of said loops, said means including a pair of chain sprockets engaging said chains, a minute cylinder disposed intermediate the sprockets and turned in synchronism therewith, said minute cylinder having a plurality of longitudinal lines calibrated in minutes, each of said lines being aligned with one pair of loops whereby the minute corresponding to said loops may be determined from the longitudinal line in alignment with the loop, and a pilot clock driven in synchronism with said minute cylinder and indicating the hour associated with each pair of said loops.

3. A program timer comprising a pair of endless chains, means for advancing said chains at a predetermined rate so that said chains complete a course of travel through said timer in exactly twelve hours, both of said chains presenting an endless succession of loops, the loops of one of said chains being positioned in exact transverse alignment with the loops of the other of said chains, each pair of opposite loops so formed corresponding to a discrete time differing from the times associated with the other pairs of loops, a plurality of pins engaging said loops, a plurality of contact actuators carried by said pins, a plurality of switches disposed transversely of the direction of travel of said chains, each switch having a finger depending into the path of said contact actuators, means for indicating the minute corresponding to any pair of said loops and indicating the particular switch to be actuated by a contact actuator mounted on one of said pins, said means including a pair of sprockets engaging said chains, a minute cylinder disposed intermediate the sprockets and turning in synchronism therewith, said minute cylinder having a plurality of longitudinal lines calibrated in minutes, each of said lines being aligned with one pair of loops whereby the minute corresponding to any of said loops may be determined from the longitudinal line in alignment with the said loop, and a plurality of spaced circumferential lines on said cylinder, said circumferential lines indicating the particular switch to be actuated by a contact actuator residing in alignment with said line.

4. A program timer comprising a housing, a pair of endless parallel chains, means for advancing said chains at a fixed rate, each of said chains presenting a plurality of loops, the loops on one of said chains being positioned in exact transverse alignment with the loops of the other of said chains, each pair of loops thus formed corresponding to a discrete time, means for setting the schedule on said parallel chains, said means including a minute cylinder having sprockets in engagement with said chains and peripheral time markings denoting the times associated with each of said loops, a plurality of pins carried by said loops, each pin having one or more contact actuators mounted thereon, a plurality of minute switches, each switch having a contact in a separate circuit and a finger projecting into the path of said contact actuators, the finger engaged by any actuator being determined by the lateral spacing of said actuator on said pin, means for silencing any circuit during a selected time period, said means including a calendar cylinder, means for rotating said cylinder at a fixed time rate, a pair of calendar dials disposed at each end of said cylinder and adapted to rotate in synchronism therewith, each of said dials being provided with a plurality of equi-spaced pin receiving apertures, the apertures on each of said dials being disposed opposite the corresponding apertures on the other of said dials, a plurality of pins adapted to reside in said apertures and be carried by said dials, a plurality of contact actuators mounted upon said pins, a plurality of calendar switches, each calendar switch having a finger projecting into the path of the contact actuators carried by said calendar dials, said calendar cylinder having a plurality of longitudinal lines marked thereon, said longitudinal lines indicating the twelve hour period associated with a particular pair of apertures, said cylinder having a plurality of spaced circumferential lines marked thereon, said lines indicating the particular switch to be actuated by a contact actuator means for rotatably mounting said minute cylinder and said calendar cylinder in said housing so that the axes of said cylinders are parallel and a portion of the periphery of each of said cylinders is readily accessible.

5. A program timer comprising a drum having sprockets at its ends and having indicia denoting successive minutes upon its periphery, endless ladder-type chains of similar configuration respectively engaging the said sprockets, means for advancing the chains at a fixed time-rate of advancement, switches, each adapted to control a signal circuit, arranged intermediate said chains, the said links of said chains providing portions to which elongated pins may be attached so as to extend from one chain to the other, whereby pins may be associated with the chains in a given program schedule sequence, and the said pins being adapted to receive actuator elements for actuating the said switches in accordance with the program schedule.

6. A program timer comprising a drum having sprockets at its ends and having indicia denoting successive minutes upon its periphery, endless ladder-type chains of similar configuration respectively engaging said sprockets, means for advancing the chains at a fixed time-rate of advancement, switches, each adapted to control a signal circuit, arranged intermediate said chains, a plurality of elongated pins, each of said pins extending between said chains and passing through a link of each of said chains, means for preventing lateral displacement of said pins, whereby pins may be associated with the chains in a given program schedule sequence, and the said pins being adapted to receive actuator elements for actuating the said switches in accordance with the program schedule.

7. A program timer comprising a drum having sprockets at its ends and having indicia denoting successive minutes upon its periphery, endless ladder-type chains of similar configuration respectively engaging said sprockets, means for advancing the chains at a fixed time-rate of advancement, switches, each adapted to control a signal circuit, arranged intermediate said chains, said switches being spaced from one another transversely of the direction of chain movement, a plurality of elongated pins, each of said pins extending between said chains and passing through a link of each of said chains, means for preventing lateral displacement of said pins, whereby pins may be associated with the chains in a given program schedule sequence, a plurality of actuator elements carried by said pins, means associated with said actuator elements for positioning them along said pins whereby said actuator elements are adapted to actuate one of said switches in accordance with the program schedule.

8. A program timer comprising a drum having sprockets at its ends and having indicia denoting successive minutes upon its periphery, endless ladder-type chains of similar configuration respectively engaging said sprockets, means for advancing the chains at a fixed time-rate of advancement, switches, each adapted to control a signal circuit, arranged intermediate said chains, said switches being spaced from one another transversely of the direction of chain advancement, a plurality of elongated pins, each of said pins extending between said chains and passing through a link of each of said chains, means for preventing lateral displacement of said pins, whereby pins may be associated with the chains in a given program schedule sequence, a plurality of contact rollers, each of said rollers being configurated to form a longitudinal opening adapted to receive one of said pins, a set screw carried by said contact roller for engagement with said pin so that the contact rolls can be mounted in a predetermined position along the pins for actuating said switches in accordance with the program schedule.

9. A program timer comprising a pair of chains, means for advancing said chains in unison at a fixed time rate so that said chains complete a course of travel through said timer in a predetermined number of hours, said chains embodying an endless succession of loops which are respectively aligned in pairs, each pair of opposite loops so formed corresponding to a discrete time in the aforesaid period differing from the times associated with the other pairs of loops, a pin engaging one pair of loops, a contact roller carried by said pin, a switch having a finger projecting into the path of said contact roller, means for indicating the time corresponding to any pair of said loops, said means including a pair of sprockets engaging said chains, and time denoting markings associated with said sprockets adjacent to one of said chains.

10. A program timer including a schedule carrier, a plurality of switch actuators carried by said schedule carrier, a plurality of schedule switches, each switch being placed in a signal circuit, each switch having a finger adapted to engage a switch actuator, and being pivotally mounted about a point remote from its finger, means for setting a schedule on said schedule carrier, said means including a schedule cylinder moved in synchronism with said schedule carrier, said schedule carrier passing over said schedule cylinder whereby a switch actuator may be shifted peripherally over said schedule cylinder to select the time at which a switch will be closed and may be shifted longitudinally over said cylinder to select the particular schedule switch to be closed, calendar means comprising a calendar wheel mounted above each of said switches, said calendar wheel being spaced from said switches to permit pivotal movement of said switches, the periphery of said calendar wheel being provided with a plurality of spaced element supporting stations, a plurality of switch hold down elements adapted to be mounted upon said calendar wheel at said stations, said calendar wheel being effective upon rotation to serially bring each of said stations into apposition with said switch whereby a hold down element disposed at said stations is juxtaposed to said switch and is effective to restrain the pivotal movement thereof, said actuators being effective to pivot a switch without closing the switch upon engagement with said finger unless said switch is restrained by one of said hold down elements.

11. A program timer comprising a schedule cylinder rotatable once each hour, said schedule cylinder having sprockets at its ends and having indicia denoting successive times adjacent to its periphery, endless ladder-type chains of similar configuration each of said chains comprising a plurality of links for respectively engaging the periphery of said sprockets, means for advancing the chains at a fixed time-rate of advancement, a switch adapted to control a signal circuit, said switch being disposed intermediate said chains, a plurality of elongated pins and a plurality of actuator elements mountable upon said pins, the said links of said chains providing portions to which said elongated pins may be attached so as to extend from one chain to the other, whereby pins may be associated with the chains in a given program schedule sequence by inserting pins through the links in registry with predetermined time indicia on said schedule cylinder, and the said pins being adapted to receive actuator elements for actuating the said switch in accordance with the program schedule.

12. A program timer comprising a schedule cylinder rotatable once each hour, said schedule cylinder having sprockets at its ends and having indicia denoting successive times adjacent to the periphery of said sprockets, endless ladder-type chains of similar configuration, each of said chains comprising a plurality of links for respectively engaging said sprockets, means for advancing the chains at a fixed time-rate of advancement, switches, each adapted to control a signal circuit, disposed adjacent to said chains, said switches being spaced from one another transversely of the direction of chain movement, a plurality of elongated pins, each of said pins extending between said chains and passing through a link of each of said chains, means for preventing lateral displacement of said pins, whereby pins may be associated with the chains in a given program schedule sequence by inserting pins through the links in registry with predetermined time indicia on said schedule cylinder, a plurality of actuator elements carried by said pins, means associated with said actuator elements for positioning them along said pins whereby said actuator elements are adapted to actuate one of said switches in accordance with the program schedule.

13. A program timer for controlling the completion of a circuit, said timer comprising a schedule cylinder rotatable once each hour, said schedule cylinder having sprockets at its ends and having indicia denoting successive times adjacent to the periphery of one of said sprockets, endless ladder-type chains of similar configuration, each of said chains comprising a plurality of links for respectively engaging the said sprockets, means for advancing the chains at a fixed time-rate of advancement, each link of said chains corresponding to a discrete time interval of a predetermined number of minutes, the said links of said chains providing portions to which elongated pins may be attached so as to extend from one chain to the other, whereby pins may be associated with the chains in a given program schedule sequence, the said pins being adapted to receive actuator elements, a schedule switch in electrical connection with said circuit and having a finger disposed in the path of travel of said actuator, and means for completing said signal circuit at any particular minute within the time interval corresponding to one link of a chain.

14. A program timer for controlling the completion of a circuit, said timer comprising a pair of chains, means for advancing said chains in unison at a fixed time rate so that said chains complete a course of travel through said timer in a predetermined number of hours, said chains embodying an endless succession of loops which are respectively aligned in pairs, each pair of opposite loops so formed corresponding to a discrete time interval of a predetermined number of minutes in the aforesaid period differing from the time interval associated with the other pairs of loops, a pin engaging one pair of loops, a contact roller carried by said pin, a schedule switch in electrical connection with said circuit and having a finger projecting into the path of said contact rolls, said actuator switch being effective to condition said circuit for completion during the time interval in which said actuator is in engagement with said finger, a fine setting switch, a fine setting cylinder including means for releasably supporting a contact actuator, said fine setting switch having a finger disposed in the path of travel of said contact actuator and being effective to close said circuit when said actuator and said finger are in engagement.

15. A program timer comprising a schedule cylinder rotatable once each hour, said schedule cylinder having sprockets at its ends and having indicia denoting successive times adjacent to its periphery, endless ladder-type chains of similar configuration, each of said latter chains comprising a plurality of links for respectively engaging the periphery of said sprockets, means for advancing the chains at a fixed time-rate of advancement, a switch adapted to control a signal circuit, said switch being disposed intermediate said chains, a plurality of elongated pins, a plurality of actuator elements mountable upon said pins, the said links of said chains providing portions to which said elongated pins may be attached so as to extend from one chain to the other, whereby pins may be associated with the chains in a given program schedule sequence, and the said pins being adapted to receive actuator elements for actuating the said switch in accordance with the program schedule, and means driven in timed relationship to the advancement of said chains for mechanical engagement with said switch to condition said switch for effecting closure of said signal circuit.

16. A program timer comprising a schedule cylinder rotatable once each hour, said schedule cylinder having sprockets at its ends and having indicia denoting successive times adjacent to the periphery of said sprockets, endless ladder-type chains of similar configuration, each of said chains comprising a plurality of links for respectively engaging said sprockets, means for advancing the chains at a fixed time-rate of advancement, switches, each adapted to control a signal circuit, disposed adjacent to said chains, said switches being spaced from one another transversely of the direction of chain movement, a plurality of elongated pins, each of said pins extending between said chains and passing through a link of each of said chains, means for preventing lateral displacement of said pins, whereby pins may be associated with the chains in a given program schedule sequence, a plurality of actuator elements carried by said pins, means associated with said actuator elements for positioning them along said pins whereby said actuator elements are adapted to actuate one of said switches in accordance with the program schedule, and means driven in timed relationship to the advancement of said chains for mechanical engagement with said switches to condition said switch for effecting closure of said signal circuits.

17. A program timer including a housing, a schedule carrier, a plurality of switch actuators carried by said schedule carrier, a plurality of minute switches, each switch having a finger adapted to engage a switch actuator, means for setting a schedule on said schedule carrier, said means including a minute cylinder moved in synchronism with said schedule carrier, said schedule carrier passing over said minute cylinder whereby a switch actuator may be shifted peripherally over said minute cylinder to select the time at which a switch will be closed and may be shifted longitudinally over said cylinder to select the minute switch to be closed, a calendar cylinder, means for rotating said calendar cylinder, said calendar cylinder carrying a plurality of contact actuators, a plurality of calendar switches, each of said switches having a finger projecting into the path of the contact actuators carried by said calendar cylinder, said contact actuators carried by said calendar cylinder being movable peripherally over said calendar cylinder to select the time at which said calendar switches will be closed and longitudinally over said cylinder to select the switch to be closed, and means for rotatably mounting said minute cylinder and said calendar cylinder within said housing with the axes of said cylinders being parallel and a portion of their periphery being readily accessible.

18. A program timer including a front panel having two openings formed therein, a schedule carrier, a plurality of switch actuators carried by said schedule carrier, a plurality of minute switches, each switch having a finger adapted to engage a switch actuator, means for setting a schedule on said schedule carrier, said means including a minute cylinder moved in synchronism with said schedule carrier, said schedule carrier passing over said minute cylinder whereby a switch actuator may be shifted peripherally over said minute cylinder to select the time at which a switch will be closed and may be shifted longitudinally over said cylinder to select the minute switch to be closed, a calendar cylinder, means for rotating said calendar cylinder, said calendar cylinder carrying a plurality of contact actuators, a plurality of calendar switches, each of said switches having a finger projecting into the path of the contact actuators carried by said calendar cylinder, said contact actuators carried by said calendar cylinder being movable peripherally over said calendar cylinder to select the time at which said calendar switches will be closed and longitudinally over said cylinder to select the switch to be closed, said calendar cylinder and said minute cylinder projecting through said openings in said front panel whereby a portion of the periphery of each of said cylinders extends outwardly beyond the front panel and greater access to said cylinders is provided.

19. A program timer comprising a panel member having openings therein, a calendar wheel rotatably mounted at one side of said panel and having calendar indicia marked on its periphery, a minute wheel mounted on the same side of the panel as the calendar wheel and having indicia indicating minutes marked on its periphery, both of said wheels being so disposed that their axes are in parallel alignment and portions of their peripheries protrude respectively through said openings, sprocket members positioned on the axis of rotation of the said minute wheel at opposite ends thereof and movable in unison therewith, endless chains respectively meshing with the said sprockets, means for supporting the endless chains in festoon arrangement adjacent that side of the panel at which said wheels are mounted, means for driving the said chains at a fixed time-rate of advancement, and means for driving the calendar wheel at a proportional slower rate of advancement, switches for calendar and minute circuit-controlling functions, and switch actuator elements carried respectively by and between said chains and by the calendar wheel for actuating the said switches in response to chain advancement and calender wheel rotation in accordance with the positioning of said elements upon said chains and said calendar wheel periphery.

References Cited in the file of this patent

UNITED STATES PATENTS

| | | |
|---|---|---|
| 224,550 | Lindner | Feb. 17, 1880 |
| 284,114 | Blodgett et al. | Aug. 28, 1883 |
| 687,865 | South et al. | Dec. 3, 1901 |
| 1,612,138 | Marcoux | Dec. 28, 1926 |
| 1,722,333 | Mamet | July 30, 1929 |
| 1,791,927 | Geiger | Feb. 10, 1931 |
| 1,795,458 | Ward | Mar. 10, 1931 |
| 1,856,496 | Miller | May 3, 1932 |
| 2,495,462 | Lassiter | Jan. 24, 1950 |
| 2,561,686 | Calhoun | July 24, 1951 |
| 2,564,228 | Pitney | Aug. 14, 1951 |
| 2,597,928 | Fehr | May 27, 1952 |
| 2,691,485 | Kennedy | Oct. 12, 1954 |